United States Patent Office 3,220,093
Patented Nov. 30, 1965

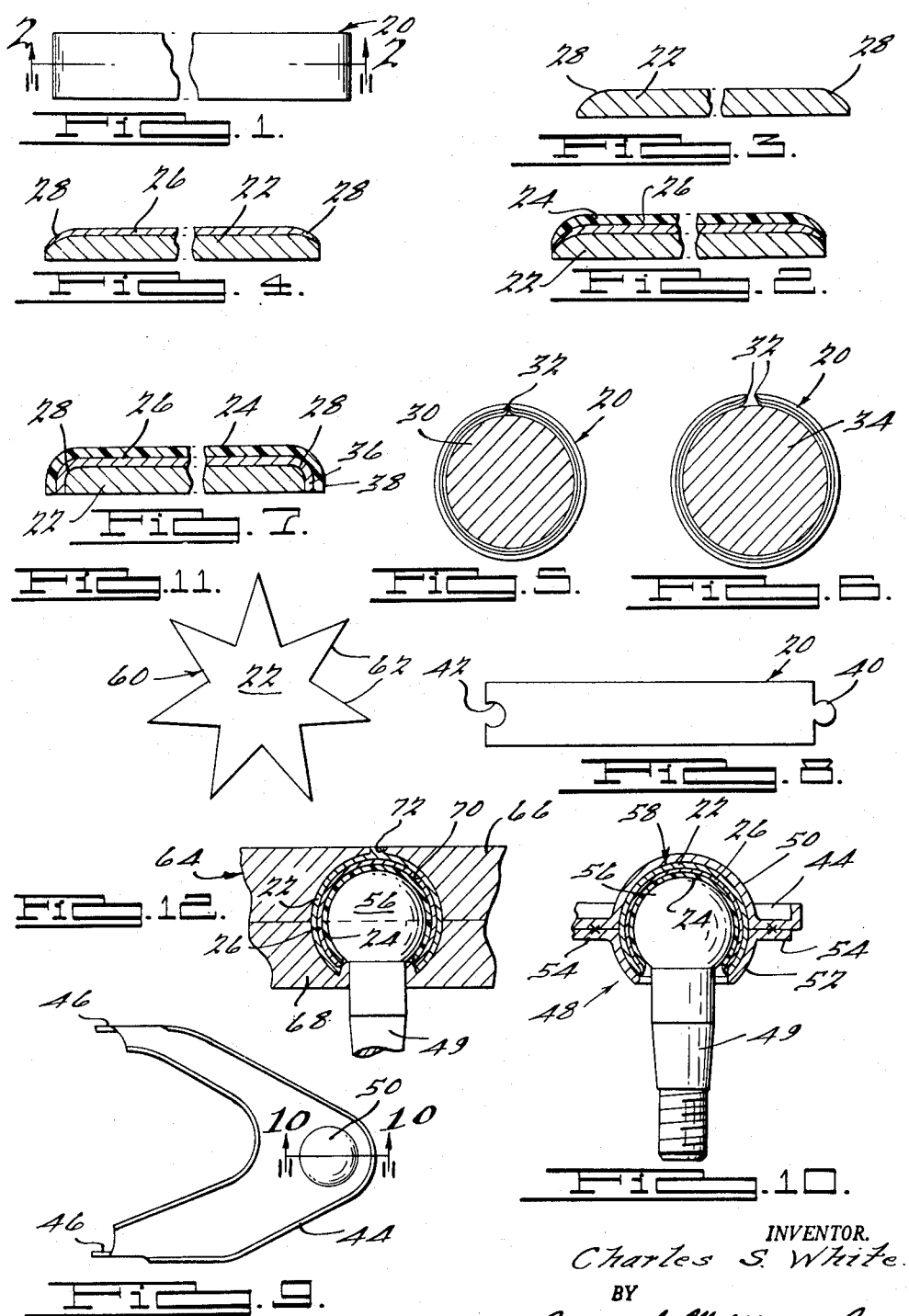
Nov. 30, 1965     C. S. WHITE     3,220,093
METHOD OF MAKING A BALL JOINT BEARING
Original Filed March 14, 1961
INVENTOR.
Charles S. White.
BY
Barnard, McYlynn & Reising
ATTORNEYS.

3,220,093
METHOD OF MAKING A BALL JOINT BEARING
Charles S. White, 35826 41st St., Palmdale, Calif.
Original application Mar. 14, 1961, Ser. No. 95,684. Divided and this application Feb. 12, 1964, Ser. No. 344,445
3 Claims. (Cl. 29—149.5)

This invention relates to bearings and particularly to a method for making a bearing in strip form which can be formed about a mandrel and finally sized directly thereto under heat and pressure. This application is a division of Serial No. 95,684 filed March 14, 1961 now abandoned.

It is an object of the invention to provide a method for making an accurately sized bearing liner that can be made by mass production methods without machining.

It is a still further object of the invention to provide a method for making a bearing liner adapted to fit over the ball of the ball and stud and be accurately conformed to the surface of the ball when a socket is clamped about the bearing liner and ball.

It is still a further object of the invention to provide a method for making a stud and ball having a bearing liner encompassing the ball thereof, the bearing liner having a low friction inner surface intimately engaging and conforming to the surface of the ball and a hard backing layer on the outer surface thereof, the ball and bearing liner being adapted to be disposed within a socket in a manner to journal the ball within the socket by the bearing liner.

It is a still further object of the invention to provide a method for making a bearing liner which is accurately sized, economical to manufacture and rugged and effective in use.

Other objects and features of novelty of the invention will be specifically pointed out or otherwise become apparent when referring, for a better understanding of the invention, to the following description taken in conjunction with the accompanying drawings wherein:

FIGURE 1 is a broken plan view of a bearing in strip form embodying features of the present invention;

FIGURE 2 is an enlarged sectional view of the structure illustrated in FIGURE 1, taken along the line 2—2 thereof;

FIGURE 3 is an enlarged sectional view similar to that of FIGURE 2 before the bonding layer and low friction layer are added to the backing layer;

FIGURE 4 is an enlarged sectional view similar to that of FIGURE 3 after the bonding layer has been applied to the backing layer;

FIGURE 5 is a sectional view of a shaped mandrel having the strip bearing of FIGURE 1 shaped to the surface thereof;

FIGURE 6 is a sectional view of a sizing mandrel having the strip bearing of FIGURE 1 encircling the surface thereof;

FIGURE 7 is an enlarged sectional view similar to that of FIGURE 2 illustrating a modification of the invention;

FIGURE 8 is a plan view similar to that of FIGURE 1 illustrating another modification of the invention;

FIGURE 9 is a plan view of a control arm for an automotive vehicle having a ball joint embodying features of the present invention secured beneath the apex thereof;

FIGURE 10 is a sectional view of the structure illustrated in FIGURE 9, taken along the line 10—10 thereof;

FIGURE 11 is a plan view of a strip bearing illustrating another form of the invention; and FIGURE 12 is a sectional view of apparatus for forming a bearing liner about a ball of a stud and ball embodying other features of the invention.

Referring to FIGURES 1 and 2, a strip bearing 20 embodying features of the present invention is illustrated which comprises an elongated, relatively thin, backing layer 22 having a low friction layer 24 secured to one face thereof by a bonding layer 26. The backing layer 22 is preferably made of metal or other similar material which can provide a relatively rigid backing for the low friction layer and still enable the strip bearing 20 to be formed about a mandrel as illustrated in FIGURE 5 and as will be described in greater detail hereinafter.

The low friction layer 24 can be any suitable low friction material which will provide a low friction face for the strip bearing 20 after it has been formed into a bushing or the like illustrated in FIGURES 5 and 6. The bonding layer 26 can be any suitable plastic material that can bond the low friction layer 24 to the backing layer 22 and be softened under heat and pressure thereafter to accurately conform the low friction layer to the surface of one of the mandrels in FIGURES 5 and 6, as will also be described in greater detail hereinafter.

Referring to FIGURE 2, the backing layer 22 is illustrated before the layers 24 and 26 are bonded thereto. All four upper edges of the backing layer are rounded as indicated by the numerals 28, and the bonding layer 26 is bonded to the upper surface of the backing layer and extends over the rounded corners thereof as illustrated in FIGURE 4. The low friction layer 24 is thereafter bonded to the bonding layer 26 so that it also covers the rounded corners 28.

After the low friction layer 24 has been bonded to the bonding layer 26, the strip bearing can then be formed about a shaping mandrel 30 as illustrated in FIGURE 5 to form the strip bearing into a bushing with the ends 32 of the strip bearing abutting against one another. If desired, the strip bearing can be made in one long strip which can be cut up into predetermined shorter lengths adapted to fit over the mandrel. Once the strip bearing is shaped about the mandrel 30, the metal backing layer 22 will retain the strip bearing in the shape of a bushing which can then be removed and disposed over a somewhat larger sizing mandrel 34, as illustrated in FIGURE 6, with the ends 32 spaced slightly apart. Heat and pressure are then applied to the bushing to soften the bonding layer 26 until it yields to close the gap between the ends 32 and accurately conforms the low friction layer 24 to the exact diameter of the sizing mandrel 34.

The ends 32 are then preferably locked together by suitable means and the bonding layer 26 hardened so that the strip bearing will retain this final bushing shape having a very accurately sized internal diameter. The bushing is thereafter slipped off the end of the mandrel 34 and used for journaling shafts having the same diameter as the sizing mandrel 34. With this method, a large number of bushing-shaped strip bearings can be formed with mass production techniques which are each very accurately sized to an exact inside diameter. To obtain the desired diameter, the low friction layer 24 is preferably made relatively thin, a thickness of several thousandths of an inch being preferred. The bonding layer 26 need only be thick enough to provide the desired conformation and, of course, must soften at a lower temperature than the low friction layer and backing layer so that bonding layer provides the conformation and not the other layers. However, it is also within the purview of the invention to provide a bonding layer 26 that also has low friction properties, in which event the low friction layer could be eliminated with the bonding layer itself providing the low friction surface after it has conformed to the mandrel and hardened.

By rounding the corners 28 of the strip bearing as described above, the ends 32 can be abutted together in a more satisfactory manner when the bushing is finally sized and the rounded corners at the ends of the bushing enable the bushing to be freely slipped on and off the shaft which it is to support without damaging the ends of the low friction layer 24. If desired, the bonding layers 26 and low friction layer 24 can be carried completely around the corners 28 of the backing layer 22 as at 36 and 38, respectively, in FIGURE 7 to cover all but the bottom surface of the backing layer 22 with the layer of low friction material 24.

As stated previously, the low friction layer 24 can be any low friction material which will provide a suitable bearing surface for the final bearing. Examples of suitable low friction materials are polytetrafluoroethylene resins, nylon, polyethylene molding compounds and monochlorotrifluoroethylene resins, the first and last resins being commonly referred to by the trade names Teflon and Kel-F, respectively. However, the preferred type of low friction layer comprises a thin layer of Teflon fibers either secured to the bonding layer 26 as a layer of flocking, felting or woven into a fabric layer, Teflon having far superior cold flow characteristics when in fiber form than when in solid sheet form. Reference is made to White Patent 2,885,248 and Reissue Patent 2,804,886 for a detailed description of two ways of bonding Teflon fabric to the bonding layer 26.

As stated previously, the bonding layer 26 can be any thermosetting or thermoplastic material which will soften and yield at a lower temperature than the low friction layer 24 so that when heat and pressure are applied in the final sizing of the bushing, as described in connection with FIGURE 6, the bonding layer 26 will yield to accurately conform the low friction layer 24 to the size of the mandrel, and can thereafter be hardened to retain the low friction layer in the final, accurate cylindrical shape. Suitable thermosetting resin materials are preferred for use as the bonding layer 26 since there are many thermosetting materials which are stronger and enable the completed bushing to support greater loads. Further, when a thermosetting resin material is used as the bonding layer 26, it can be partially polymerized or cured after bonding the low friction layer 24 to the backing layer 22 as illustrated in FIGURE 4 to provide a strip bearing which can be stored indefinitely in its hardened partially cured strip form. When it is desired to form the final bushing from the partially cured strip bearing, the strip bearing can be shaped as described in connection with FIGURE 5, and finally sized under heat and pressure as illustrated and described in connection with FIGURE 6, the thermosetting bonding layer 26 softening under heat and pressure to conform the layer of low friction material accurately to the surface of the mandrel 34 before it is finally cured and hardens to rigidly retain the low friction layer in its exact final shape.

Referring to FIGURE 8, a modification of the strip bearing 20 is illustrated wherein a circular tongue 40 is provided on one end of the strip bearing 20 and a corresponding groove 42 is provided in the other end thereof. When the bearing is finally sized about the sizing mandrel 34, the tongue 40 can be fitted within the groove 42 to interlock the ends 32 together and provide a smooth flush outer surface. In each of the embodiments described, the bushing is preferably used as a liner for the body or member which is to support the shaft and would preferably be secured within a suitable aperture in the body or member through which the shaft extends. Consequently, the ends 32 need not necessarily be locked together, but can be abutted together within the aperture (since they are abutted together when finally shaped about the sizing mandrel 34) and still retain their accurate internal diameter.

Referring to FIGURES 9 and 10, a control arm 44 is illustrated having legs 46 on the inner end thereof adapted to be pivotally mounted on the frame of an automotive vehicle for supporting a front wheel of the vehicle. A ball joint 48 is secured to the underside of the pivoting end thereof and has a stud 49 adapted to be connected to the front wheel. A semispherical dome 50 is formed on the pivoting end of the control arm to provide the upper half of the socket for a ball 56 and a generally truncated stamping 52 having radially extending flanges 54 provides the lower half of the ball joint, the flanges 54 being welded or otherwise suitably secured to the underside of the control arm 44. The ball 56 of the ball joint is journaled within the socket by a bearing liner 58 which comprises the same three layers as the strip bearing 20, namely, the low friction layer 24, the bonding layer 26 and the backing layer 22. The bearing liner 58 is formed about the ball 56 in a manner somewhat similar to the way the strip bearing 20 was formed about the shaping mandrel of FIGURE 5. The ball with the liner thereabout is then positioned within the socket between the dome 50 and the truncated spherical bottom stamping 52. The bearing liner is made slightly oversize so that the flanges 54 of the bottom stamping 52 do not quite meet the underside of the control arm. Heat is then applied to the ball joint to soften the bonding layer 26 and the flanges 54 are urged into abutting engagement with the control arm to exert radial pressure on the bearing liner 58 to cause the bonding layer 26 to yield and accurately conform the low friction layer 24 to the surface of the ball 56. After the bonding layer 26 is hardened, the low friction layer 24 is supported in position to intimately and accurately engage the surface of the ball to journal the ball in the socket. Normally, the greater friction between the backing layer 22 and socket will prevent the liner from shifting relative to the socket, but if desired, the liner can also be positively fixed against shifting relative to the socket by any suitable means, such as by welding, or by mechanically interlocking the liner and socket together.

Referring to FIGURE 11, one way of forming the bearing liner 58 is illustrated. In this example, the bearing liner is first formed in a flat, star-shaped bearing 60 having a plurality of points or projections 62. The flat bearing 60, of course, comprises the same three layers as the bearing strip 20 and, as illustrated in FIGURE 11, the backing layer 22 is on the upper side. The points 62 are proportioned so that the bearing 60 can be fitted over the dome of the ball and formed about the ball with the projections engaging the underside of the ball and nesting snugly together. Once formed over the ball in this manner, the ball with the liner thereon can be fitted between the dome 50 and stamping 52 and heat and pressure applied as previously described to conform the low friction layer 24 accurately to the surface of the ball 56. If desired, the bonding layer 26 can be made from a thermosetting material and can be partially cured when the bearing 60 is in its flat shape as illustrated in FIGURE 11, and finally cured after the bearing liner has been formed over the ball and the heat and pressure is applied. Also, if the low friction layer 24 comprises a fabric material it can be woven with an elastic or expansible weave to facilitate its formation about the dome of the ball 56.

Referring to FIGURE 12, a split die apparatus is illustrated which provides another way of forming the bearing liner 58 for a ball joint. This apparatus comprises a split die 64 having two halves 66 and 68 fitted together over the ball of a stud and ball with a sufficient clearance therebetween to provide a cavity 70 between the surface of the ball and the die elements 60 and 68. In this construction, the low friction layer 24 and bonding layer 26 are disposed about the ball 56 and a suitable backing material is injected under pressure through an aperture 72 in the upper portion of the die to completely fill the space within the cavity 70, the lower portion of the die sealing about the juncture of the stud and ball to prevent the material from escaping. After the material is hardened, it provides the backing layer 22 for the bearing liner 58. The die elements 66 and 68 can then be split apart and the ball with the bearing liner 58 thereon removed and inserted between the dome 50 and lower stamping 52 of the ball joint 48. Heat and pressure can then be applied as previously described to finally form the lower friction layer 24 to the surface of the ball 58.

If desired, the low friction layer 24 can be finally formed to the surface of the ball 56 by the heat and pressure of the injected material which will retain the low friction layer in accurate surface engagement with the ball after it hardens. The bearing liner can then be merely clamped between the dome 50 and stamping 52 without providing additional heat for forming the low friction layer 24 to the ball.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a method for making a ball joint bearing, the steps of disposing around a ball member a layer of low friction material and a layer of bonding material with the layer of low friction material being immediately adjacent said ball member, and then injection molding with heat and pressure a hardenable material around and against said bonding layer whereby said hardenable material bonds to said bonding layer and forms a backing which encompasses said ball and said low friction layer and which is adapted to be tightly clamped within a metal socket to form a ball joint.

2. A method as set forth in claim 1 wherein said metal socket comprises a pair of metal stampings each having an outwardly extending anular flange, said backing being clamped within said metal socket by assembling said members around said backing and then securing said flanges together.

3. A method for making a ball joint bearing comprising the steps of disposing around the ball member a layer which includes a low friction fibrous material in contact with said ball member and a bonding material which is exposed on the outer surface of said layer, injection molding a hardenable material around and against said bonding material whereby said hardenable material bonds to said bonding material and forms a backing encompassing said ball and said layer, and thereafter clamping said backing in a metal socket to thereby form the ball joint.

References Cited by the Examiner

UNITED STATES PATENTS

| | | | |
|---|---|---|---|
| 2,835,521 | 5/1958 | White | 287—90 |
| 2,838,436 | 6/1958 | Clingman | 156—212 |
| 2,906,573 | 9/1959 | Runton | 308—72 |
| 2,932,081 | 4/1960 | Witte | 29—149.5 |
| 3,085,312 | 4/1963 | Evans | 29—441 |

WHITMORE A. WILTZ, *Primary Examiner.*

THOMAS H. EAGER, *Examiner.*